United States Patent
Mellone et al.

[11] Patent Number: 5,563,910
[45] Date of Patent: Oct. 8, 1996

[54] RECURSIVE BAUD RATE DETECTION METHOD AND APPARATUS

[75] Inventors: Charles M. Mellone; Gregory O. Snowden, both of Boynton Beach, Fla.

[73] Assignee: Motorola, Inc., Schaumburg, Ill.

[21] Appl. No.: 151,703

[22] Filed: Nov. 12, 1993

[51] Int. Cl.⁶ .............................. H04B 3/46; G08B 5/22
[52] U.S. Cl. ..................... 375/225; 375/224; 455/226.1; 340/825.44
[58] Field of Search .................................... 375/224, 340, 375/342, 377, 94, 225, 227; 455/38.3, 343, 226.1, 229; 340/825.44, 825.14; H04B 3/46

[56] References Cited

U.S. PATENT DOCUMENTS

| | | | |
|---|---|---|---|
| 4,837,854 | 6/1989 | Oyagi et al. | 455/343 |
| 5,095,498 | 3/1992 | Deluca et al. | 375/94 |
| 5,140,702 | 8/1992 | Laflin | 455/166.1 |
| 5,241,568 | 8/1993 | Fernandez et al. | 375/116 |
| 5,296,849 | 3/1994 | Ide | 340/825.44 |

Primary Examiner—Kim Vu
Assistant Examiner—Madeleine Anh-vinh Nguyen
Attorney, Agent, or Firm—Gregg Rasor

[57] ABSTRACT

A selective call receiver (5) has a programmable baud detector (12, 14) which is programmed (30) to test (33) for an absence of a paging signal having a predetermined baud rate at a first falsing rate and the programmed (36) to test (38) for either the presence or absence of the signal at a second baud rate lower than the first falsing rate, wherein samples from the first test (33) are also used in the determination made by the second test (38).

9 Claims, 3 Drawing Sheets

RECURSIVE BAUD RATE DETECTION METHOD AND APPARATUS

FIELD OF THE INVENTION

This invention relates generally to the area of detection of a presence or absence of an information signal having a predetermined baud rate.

BACKGROUND OF THE INVENTION

In portable devices such as pagers, a radio frequency signal having information modulated at a predetermined baud rate is used to communicate paging information. Since pagers are miniature and portable, it is desirable to use miniature batteries for a power source. It follows that it is desirable to conserve battery power in order that the battery life of the pager be maximized. Since a paging signal is sometimes present and sometimes absent, it is desirable to provide a pager capable of reliably determining the presence or absence of the paging signal while consuming as little battery power as possible.

When using a baud rate detector, the absence of a signal may in most cases be determined rapidly. As soon as the absence is detected, the receiver portion of the pager is switched off, thereby conserving battery power. However, due to statistical characteristics of the noise or undesirable signals at other baud rates, they may falsely appear as the predetermined baud rate of the desired signal. A determination of the absence of the desired signal as being the desired signal is referred to as falsing. False detection of a signal consumes excessive power because the pager then continues to operate the receiver for an extended period of time attempting to synchronize to the signal when in fact, the desired signal is not present.

Thus, what is needed is a method and apparatus capable of rapidly detecting the absence of the signal while reducing falsing.

BRIEF SUMMARY OF THE INVENTION

A selective call receiver determines the presence or absence of a signal having a predetermined baud rate. The selective call receiver comprises a testing means for testing for an absence of a signal at a first falsing rate. The receiver also comprises a recursive testing means for recursively testing for a presence or absence of the signal at a second falsing rate less than the first falsing rate in response to said testing means not determining the absence of the signal.

A method of detecting a signal having a predetermine baud rate comprises the steps of sampling the signal to produce a first sample set; testing the first sample set to determine an absence but not a presence of the signal; sampling the signal to produce a second sample set inclusive of the first sample set in response to not determining the absence of the signal; and testing the second sample set to determine the absence of the signal.

DESCRIPTION OF THE PREFERRED EMBODIMENT

Figure 1:
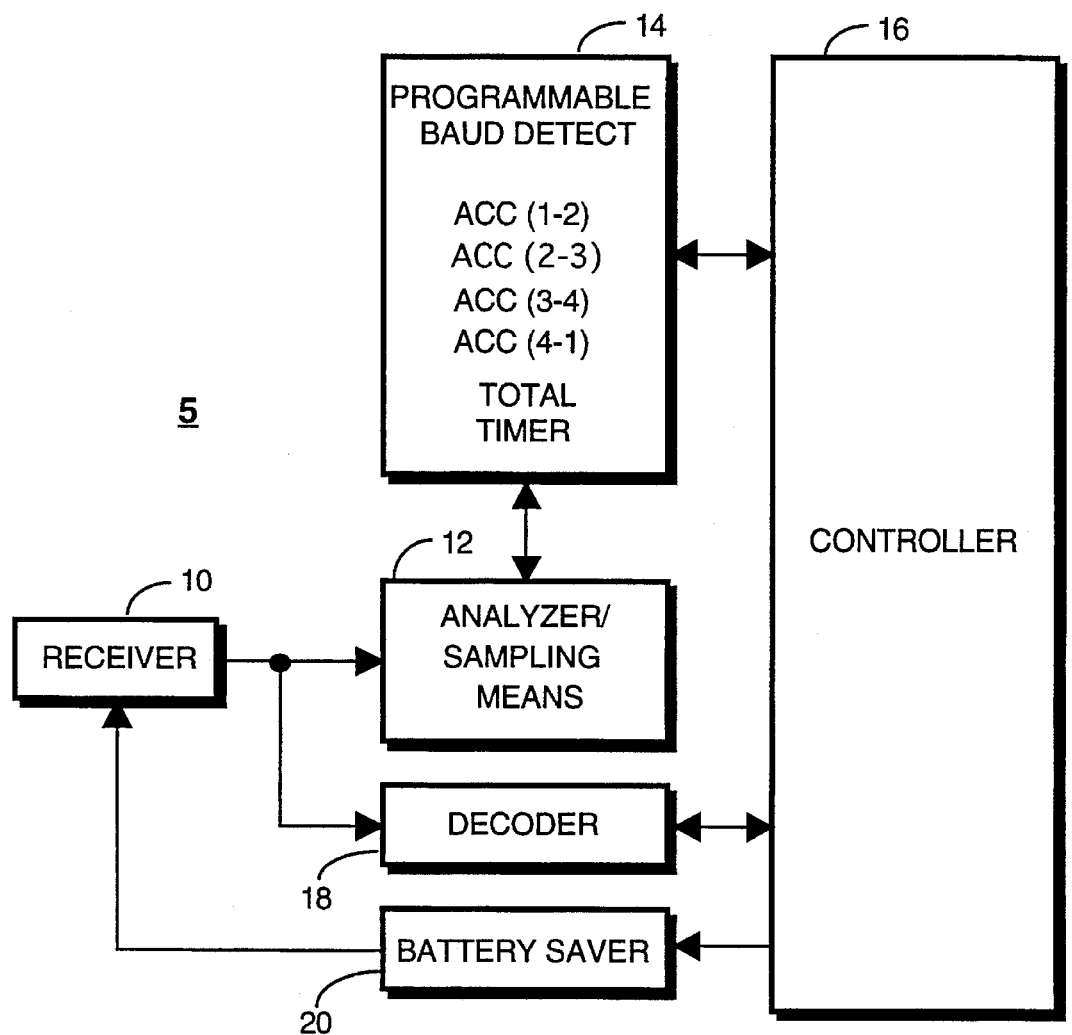
FIG. 1 shows a block diagram of a paging receiver operating in accordance with the preferred embodiment of the present invention.

FIG. 1 shows a block diagram of a paging receiver 5 operating in accordance with the preferred embodiment of the present invention. A receiver 10 receivers and demodulates a radio frequency signal having paging information modulated thereon. The paging information may be contained within a paging protocol such as a well known POCSAG paging protocol which has binary information modulated at a predetermined baud rate of either 512, 1200 or 2400 bits per second.

The information demodulated by receiver 10 is presented to a programmable baud rate detector 12 and 14. The operation of the programmable baud rate detector is described in detail in U.S. Pat. No. 5,181,227 which is assigned to the assignee of the present invention. Said patent is hereby incorporated by reference. The analyzer/sampling means 12, cause the output of receiver 10 to be sampled at four times the baud rate. The samples are analyzed in accordance with values entered into accumulators and registers of the programmable baud rate detector 14 in order to determine the presence or absence of the signal. The programmable baud rate detector includes four accumulators; ACC(1-2), ACC(2-3), ACC(3-4), and ACC(4-1) which correspond to four one half bit wide windows spaced a quarter bit apart. The values in the accumulators decrement in response to the occurrence of a transition during the respective window. The total register counts the total number of transitions, and the timer register determines the amount of time which the baud rate detector has run. All of the registers and accumulators in baud rate detector 14 may be read, written and modified by controller 16. Controller 16 controls the operation of many of the functions of paging receiver 5 including the programmable baud rate detector 14. If a presence of a paging signal is determined by the baud rate detector 14, controller 16 cause decoder 18 to analyze the signal received by receiver 10 in order to synchronize to the signal and then decode the paging information. In response to the determination of the absence of signal by baud rate detector 14 or decoder 18, or in response to decoder 18 synchronizing to a POCSAG signal, controller 16 causes battery saver 20 to periodically switch off receiver 10, thereby conserving the power drawn from a battery (not shown) powering the paging receiver 5. The functions of baud rate detector 12 and 14, controller 16, decoder 18, and battery saver 20 may be partially or entirely implemented in a microcomputer such as a 1468HC05L8 microcomputer manufactured by Motorola Inc.

Figure 2:
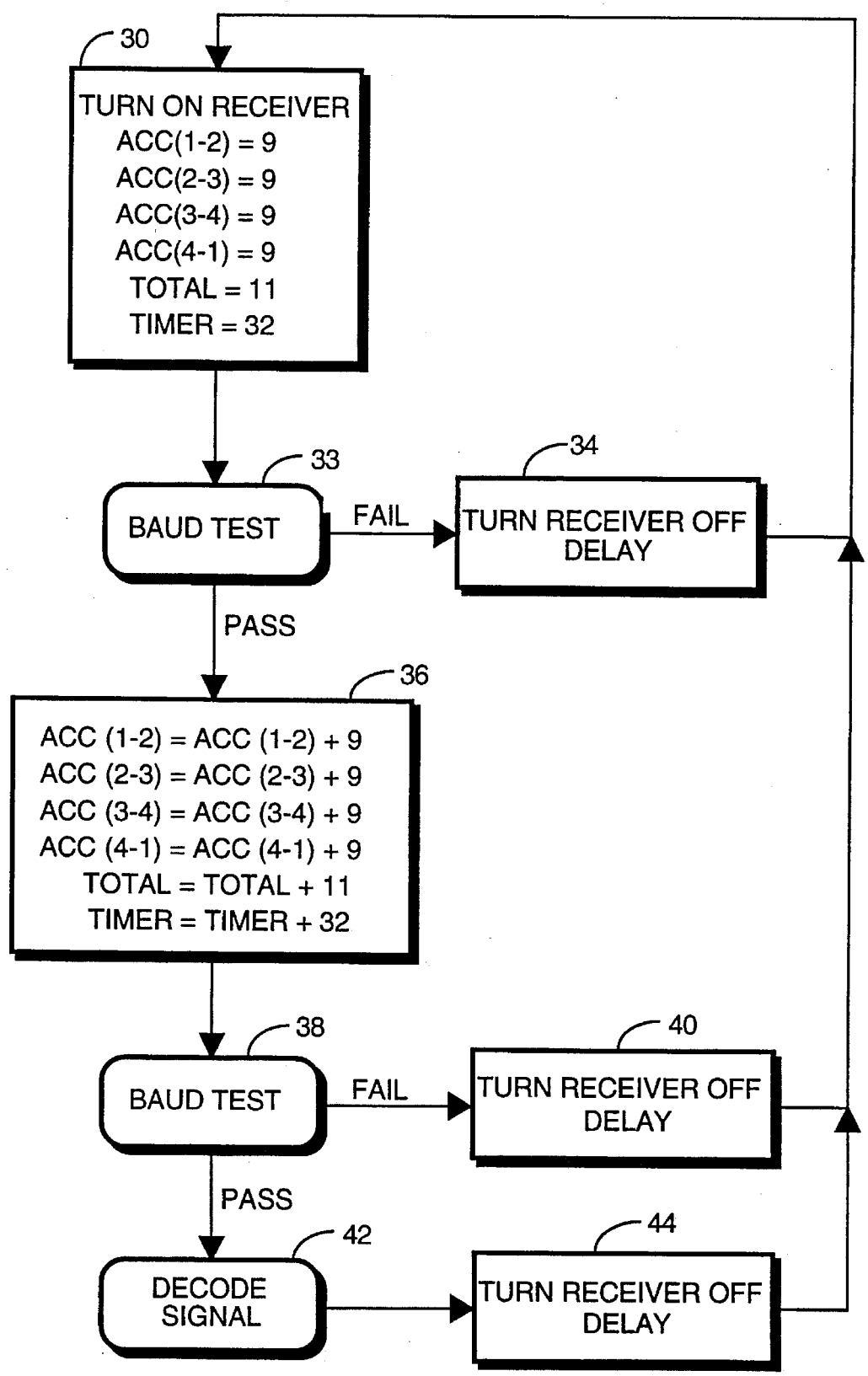
FIG. 2 shows a flowchart of a pager operating in accordance with the preferred embodiment of the present invention.

FIG. 2 shows a flowchart of a pager operating in accordance with the preferred embodiment of the present invention. In step 30, the receiver is turned on, thereby consuming battery power, the accumulators ACC(1-2), ACC(2-3), ACC(3-4), and ACC(4-1) are set to values of nine, the total register is set to a value of eleven, and the timer is set to a value of thirty two, step 30 (i.e. 9, 11, 32). Then the baud test is run, step 33. The baud test is shown in more detail in FIG. 3 as well as in the incorporated U.S. Pat. No. 5,181,227. If the baud test fails, indicating the absence of a paging signal, the receiver is turned off for a predetermined delay time, step 34. After the delay, baud rate testing continues anew by the reentry of step 30. If the baud test passes, the presence of the signal is not determined, and step 36 adds a value of nine to the current value of each of ACC(1-2), ACC(2-3), ACC(3-4), and ACC(4-1), as well as adding a value of eleven to the total register and thirty two to the timer (i.e. 9, 11, 32). Then the baud test is again run, step 38. This second entry corresponds to a recursive entry of the baud test of FIG. 3. If the baud test fails, the receiver is turned off for a predetermined delay, step 40, after which baud rate testing continues anew by the reentry of step 30. The execution of either steps 34 or 40 correspond to a battery saving in absence of a paging signal. If the baud test passes, then the signal is decoded, step 42. Signal decoding requires acquisition and maintenance of synchronization to the (POCSAG) signal, as well as decoding the information portion of the signal for paging information. Signal decoding, step 42, may be partially performed in parallel with the baud tests 33 and 38, and also includes known battery saving operations. Upon termination of the signal, the receiver is turned off for a delay, step 44, after which baud rate testing continues anew by the reentry of step 30.

Figure 3:
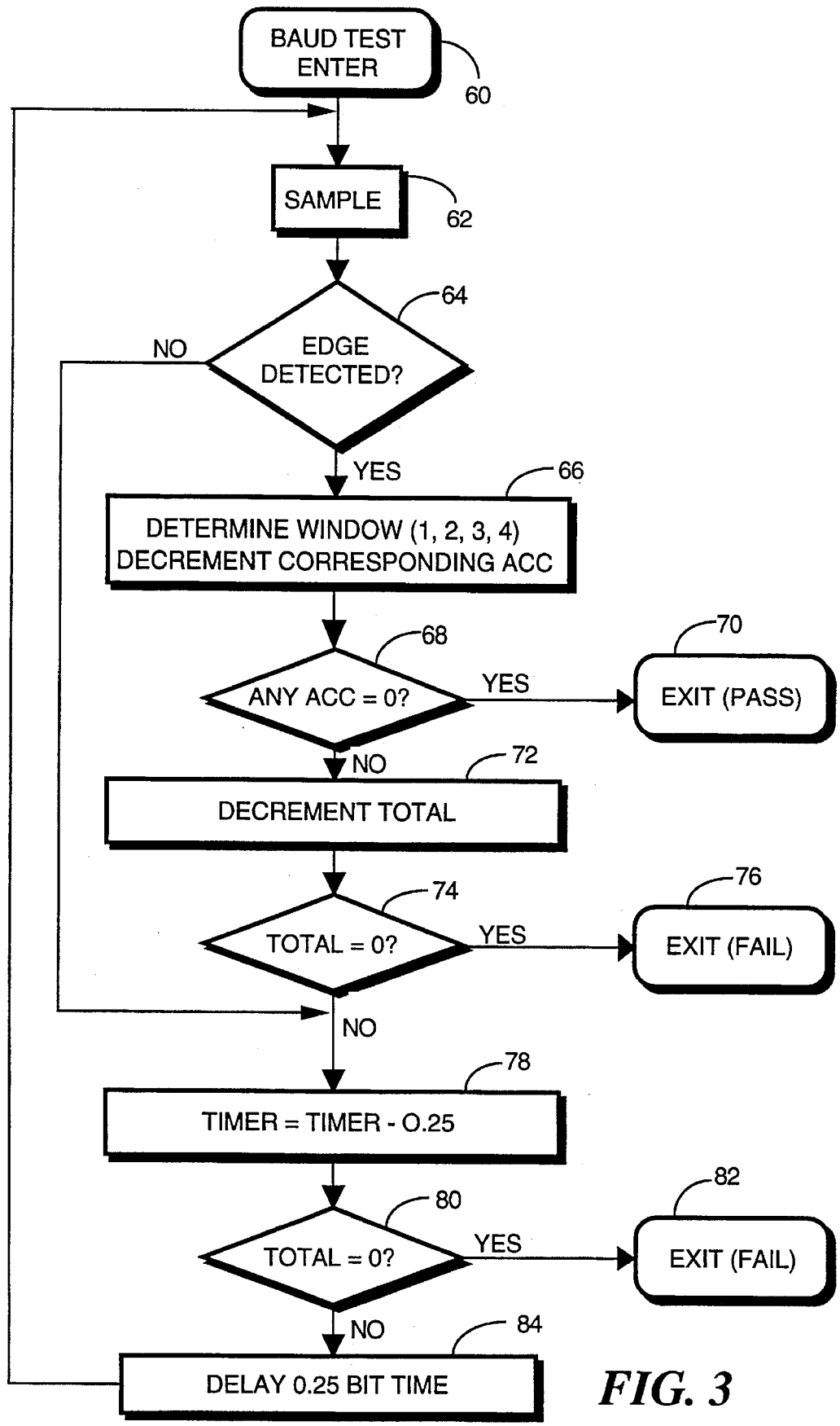
FIG. 3 shows a flowchart of the operation of the baud test in accordance with the preferred embodiment of the present invention.

FIG. 3 shows a flowchart of the operation of the baud test (steps 33 and 38 of FIG. 2) in accordance with the preferred embodiment of the present invention. The operation is shown in more detail in incorporated U.S. Pat. No. 5,181,227. The baud test is entered at step 60, then the signal from receiver 10 is sampled at step 62. If an edge is detected, step 64, step 66 determines in which of four fractions of a quarter bit the edge occurred. Then the two corresponding accumulators are decremented. For example, if the edge occurred in the third fraction, accumulators having an identifier of three would be decremented, i.e. ACC(2-3) and ACC(3-4). Then, step 68 determines if any accumulator has a value of zero. If so, there is a statistical probability that the signal has the desired baud rate and the program exits with a "pass" condition, step 70. Otherwise, the total register is decremented, step 72, and if the total register equals zero, step 74, the program exits with a "fail" condition, step 76. This indicates the statistical probability that there is no signal present with the desired baud rate. If either the total does not equal zero, or no edge was detected, step 64, the timer is decremented by a quarter of a bit time, step 78. If the timer equals zero, step 80, the program exits with a "fail" condition, step 82. Otherwise, the program delays for a quarter of a bit time, step 84, and returns to sample at step 62.

FIG. 3 shows how the selective call receiver 5 having a programmable baud rate detector 14, implements a sampling means 12 for determining an occurrence of the transitions within one of four windows one half of a bit time wide space a quarter of a bit time apart. The flowchart implements the steps of accumulating up to a first predetermined number of transitions as indicated by the value in the total register, and then determining the absence of the signal within the first predetermined number of transitions if a second predetermined number of transitions, equal to a value in an accumulator, has not occurred within one of the multiplicity of windows.

FIG. 2 shows a recursive baud rate test in order to determine the presence of a signal. In the first entry of the baud test 33, the accumulators, total, and timer of the programmable baud detector 14 are loaded with values of 9, 11, 32 respectively. If the absence of signal is not found, step 36 causes the values of 9, 11, 32 to be added to the programmable baud detector, and the baud rate is again tested. Since the values are added, and not reset, this recursive use of the baud test results equivalent to programming the values of 18, 22, 64 into the programmable baud detector. Experimental results have shown that using the values of 9, 11, 32 yields a 8% falsing rate, while using the values of 18, 22, 64 yields a falsing rate of 0.4%. The implementation of FIG. 2 has two advantages. First, if there is a noise environment, the first execution of the baud test, step 33, will find the absence of signal 92% of the time within eleven transitions. However, if the values of 18, 22, 32 were used in a non-recursive approach, then twenty two transitions would be required to detect the absence of signal. Thus, the recursive method allows much faster detection of an absence of signal in most situations. Second, if step 36 merely re-initialized to the values of 9, 11, 32 instead of adding the values, the falsing rate would be 0.65% instead of the 0.4% realized by the recursive entry of the baud test. Thus, experiments show a recursive baud test provides a 35% improvement in the falsing rate relative to two independent runs of the baud test when equivalent parameters are used.

Furthermore, experimental results show that the two independent runs of the baud tests using 9, 11, 32 values can cause degradation in paging sensitivity of up to 1.5 dB relative to one run of 9, 11, 32. However, a recursive run of the baud test using 18, 22, 64, shows experimental degradations in paging sensitivity of only 0.3 dB or less. Thus, the invention has the further advantage of reducing falsing without a significant degradation in paging sensitivity.

FIG. 2 shows a method of detecting a signal having a predetermine baud rate. The first baud test, step 33, corresponds to sampling the signal to produce a first sample set and then testing the first sample set to determine an absence of the signal, step 34, but not a presence of the signal. If the baud test 33 passes, step 36 causes the second baud test, step 38, to sample the signal to produce a second sample set inclusive of the first sample set and then test the second sample set to determine a presence, step 42, or the absence, step 40, of the signal.

In an alternate embodiment of the invention, the "pass" result from step 38 could again enter another step similar to 36 for again adding values to accumulators and registers, and then recursively entering the baud test a third time. In this manner, the recursive entry process could be repeated indefinitely to obtain desired falsing rates and noise detection times.

Since the falsing rate of the first baud test, step 33, is 8% and the falsing rate of the recursively entered second baud test, step 38, is 0.4%, the invention shows a method and apparatus for determining the presence or absence of a signal having a predetermined baud rate comprising the steps of testing for an absence the a signal at a first falsing rate of 8%, step 33, and recursively testing for a presence or absence of the signal, step 38, at a second falsing rate of 0.4% which is less than the first falsing rate. When the programmable baud detector 14 is programmed by step 30 and then operated by step 33, it forms a testing means for testing for an absence the a signal at a first falsing rate of 8%. And when the programmable baud detector 14 is reprogrammed by step 36 and again operated by step 38, it forms a recursive testing means for recursively testing for a presence or absence of the signal at a second falsing rate of 0.4% which is less than the first falsing rate.

It can be appreciated that the values of 9, 11, 32 of either step 30 or 36 or subsequent recursive operations of the baud test may be modified while remaining in accord with the present invention. For example, a first initialization of 6, 8, 24, at step 30, could quickly find an absence of most signals at step 33. Then a recursive entry using additional values of 8, 9, 32 at step 36 (thereby having a total of 14, 17, 56) could be used in the recursive baud test, step 38, to reduce the probability of falsely entering the signal decoding step 42. Many other combinations of falsing rates may be used without departing from the spirit and scope of the invention.

Thus, what has been provided is a method and apparatus capable of rapidly detecting the absence of the signal while reducing falsing.

We claim:

1. In a selective call receiver having a baud rate detector having a programmable falsing rate, a method for determining a presence or absence of a signal having a predetermined baud rate comprising the steps of:

(a) testing to determine the absence of the signal at a first falsing rate as determined by a first accumulator value, a first total value, and a first timer value as an accumulator value, at total value, and a timer value, respectively, said testing step comprising the steps of:
      (i) programming the accumulator value in a plurality of accumulators forming four one half bit wide sampling windows spaced a quarter bit apart; the total value in a total register, and the timer value in a timer register;
      (ii) performing a baud test over a time determined by the timer value during which each of the plurality of accumulators operate to accumulate a number of transitions corresponding with samples taken in each of the four one half bit wide sampling windows; and
      (iii) confirming absence of the signal if either:
         none of the plurality of accumulators have decremented from the accumulator value to zero; and
         the total register has not decremented from the total value to zero; and
      (iv) confirming presence of the signal if either:
         any of the plurality of accumulators have decremented from the accumulator value to zero; and
         the total register has decremented from the total value to zero; and (b) recursively testing to determine the presence or absence of the signal in response to said step (a) of testing not determining the absence of the signal, by performing step (ii), (iii), and (iv) using a second falsing rate less than the first falsing rate, the second falsing rate determined by adding the first accumulator value, the first total value, and the first timer value to the accumulator value, the total value, and the timer value, respectively, without resetting or reprogramming the accumulator value, the total value, or the timer value, respectively.

2. The method according to claim 1 further comprising the step of conserving power in a means for receiving the signal in response to said step (a) of testing determining the absence of the signal.

3. The method according to claim 1 further comprising the step of conserving power in a means for receiving the signal in response to said step (b) of recursively testing determining the absence of the signal.

4. The method according to claim 1 wherein the signal has digital information encoded at the predetermined baud rate wherein the method further comprises the step of decoding the digital information in response to said step (b) of recursively testing determining the presence of the signal.

5. The method according to claim 1 wherein the first accumulator value is nine, the first total value is eleven and the first timer value is thirty-two.

6. A selective call receiver for determining a presence or absence of a signal having information modulated at a predetermined baud rate, the selective call receiver comprising:

a receiver for receiving the signal;
   a falsing tester that determines the absence of the signal at a first falsing rate defined by a first accumulator value, a first total value, and a first timer value, that are programmed as an accumulator value, a total value, and a timer value, respectively, the falsing tester performing a baud test over a time determined by the timer value during which each of a plurality of accumulators operates to accumulate a number of transitions corresponding with samples taken in each of the four one half bit wide sampling windows, and confirming absence of the signal if either none of the plurality of accumulators have decremented from the accumulator value to zero or the total register has not decremented from the total value to zero, and confirming presence of the signal if either any of the plurality of accumulators have decremented from the accumulator value to zero or the total register has decremented from the total value to zero;
   the falsing tester operating in a recursive fashion to determine the presence or absence of the signal at a second falsing rate less than the first falsing rate when the first falsing rate has not determined the absence of the signal, the second falsing rate being determined by adding the first accumulator value, the first total value, and the first timer value to the accumulator value, the total value, and the timer value, respectively, without resetting or reprogramming the accumulator value, the total value, or the timer value, respectively; and
   a decoder for decoding the information in response to said falsing tester determining the presence of the signal.

7. The selective call receiver according to claim 6 wherein the first accumulator value is nine, the first total value is eleven and the first timer value is thirty-two.

8. In a selective call receiver having a baud rate detector for determining a presence or absence of a signal having transitions indicative of a predetermined bit rate, the baud rate detector having a sampling means for determining an occurrence of the transitions within an at least one of four windows one half of a bit time wide, the method comprising the steps of:

(a) accumulating up to eleven of transitions;
   (b) determining the absence of the signal within the eleven transitions if nine transitions has not occurred within one of four windows;
   (c) accumulating up to twenty-two transitions including the eleven transitions of said step (a) of accumulating; and
   (d) determining the presence of the signal within the up to twenty-two transitions, if eighteen transitions has occurred within one of the four windows.

9. The method according to claim 8 further comprising the steps of:
   (e) determining the absence of the signal if eleven transitions do not occur within thirty two bit times; and
   (f) determining the absence of the signal if twenty-two transitions do not occur within sixty four bit times.

* * * * *

UNITED STATES PATENT AND TRADEMARK OFFICE
CERTIFICATE OF CORRECTION

PATENT NO.   : 5,563,910
DATED        : October 8, 1996
INVENTOR(S)  :
              Mellone et al.

It is certified that error appears in the above-indentified patent and that said Letters Patent is hereby corrected as shown below:

Column 5, line 15, after value delete "at" and insert
--a--.

Signed and Sealed this

Twenty-second Day of April, 1997

*Attest:*

*Attesting Officer*

BRUCE LEHMAN

*Commissioner of Patents and Trademarks*